United States Patent
Li et al.

(10) Patent No.: US 12,424,900 B1
(45) Date of Patent: Sep. 23, 2025

(54) VARIABLE-ECCENTRIC-RADIUS BRUSHLESS MOTOR AND ECCENTRIC DISTANCE ADJUSTING METHOD

(71) Applicant: Shenzhen Huayi Intelligent Electronic Technology Co., Ltd., Shenzhen (CN)

(72) Inventors: Juan Li, Yiyang (CN); Li Xu, Shenzhen (CN)

(73) Assignee: Shenzhen Huayi Intelligent Electronic Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/245,163

(22) Filed: Jun. 20, 2025

(30) Foreign Application Priority Data

Sep. 20, 2024 (CN) .......................... 202411317274.3

(51) Int. Cl.
*H02K 7/075* (2006.01)
*H02K 1/16* (2006.01)

(52) U.S. Cl.
CPC .............. *H02K 7/075* (2013.01); *H02K 1/16* (2013.01); *H02K 2213/09* (2013.01)

(58) Field of Classification Search
CPC ...... H02K 7/075; H02K 1/16; H02K 2213/09; H02K 29/00; H02K 5/04; H02K 5/24; H02K 7/003; H02K 7/00
See application file for complete search history.

(56) References Cited

U.S. PATENT DOCUMENTS

| | | | |
|---|---|---|---|
| 11,316,407 B2* | 4/2022 | Ha ........................... | H02K 1/30 |
| 2002/0047372 A1* | 4/2002 | Takahashi .............. | H02K 7/075 |
| | | | 310/81 |

FOREIGN PATENT DOCUMENTS

| | | |
|---|---|---|
| CN | 204210054 U | 3/2015 |
| CN | 217186598 U | 8/2022 |
| CN | 117167270 A | 12/2023 |

* cited by examiner

*Primary Examiner* — Naishadh N Desai
(74) *Attorney, Agent, or Firm* — Nitin Kaushik

(57) ABSTRACT

The present disclosure discloses a variable-eccentric-radius brushless motor and an eccentric distance adjusting method, and relates to the technical field of brushless outer rotor motors. The variable-eccentric-radius brushless motor includes a rotor set, a stator set, an eccentric assembly, and an adjusting mechanism, where the rotor set is provided with a motor housing, and the motor housing is provided with an integrally connected rotating central shaft; and the adjusting mechanism is provided with an adjusting shaft. The eccentric assembly and the adjusting mechanism are used to adjust an eccentric radius, providing wider applicability.

10 Claims, 13 Drawing Sheets

VARIABLE-ECCENTRIC-RADIUS BRUSHLESS MOTOR AND ECCENTRIC DISTANCE ADJUSTING METHOD

CROSS-REFERENCE TO RELATED APPLICATIONS

The application claims priority to Chinese patent application No. 202411317274.3, filed on Sep. 20, 2024, the entire contents of which are incorporated herein by reference.

TECHNICAL FIELD

The present disclosure relates to the technical field of brushless outer rotor motors, in particular to a variable-eccentric-radius brushless motor and an eccentric distance adjusting method.

BACKGROUND

None of motors of fascia guns on the market is equipped with an eccentric wheel (crank) structure, and eccentric wheel (crank) parts and radius adjusting movable members need to be additionally assembled. Besides, most eccentric wheels cannot adjust eccentric radii, large spaces are needed for mutual fixing and assembly of the parts, and the movement stability and noises of the fascia guns are greatly affected by accumulated tolerance in assembly processes. Adjustable-eccentric-wheel-radius products of some fascia guns are mounted later, that is, after the motors are fixed to housings of the fascia guns, the eccentric wheels and eccentric radius adjusting portions are assembled; and when abnormalities occur in the assembly processes, the whole machines need to be disassembled for repair, which is adverse to the production of the fascia guns. From the perspective of use by end-users, the fascia guns with the unchangeable eccentric radii can only maintain the movement of the same stroke; however, different parts of human bodies are difference in muscle distribution and fascia layer depth, for example, thighs, hands and hips are different in muscle thickness, so that the fascia layer depths are different. Therefore, the beating stroke needs to be changed for the different levels of fascia layers. However, none of the motors on the market is equipped with an eccentric wheel (crank) and an adjustable-eccentric-radius structure.

Most transmission eccentric motors are split, that is, an eccentric wheel is added to a brushless motor to generate an eccentric force, and the eccentric wheel is connected to a piston component to form a massage tool or an electric tool. This method has the defects as follows: the cost of the eccentric wheel is increased; the stability and consistency after assembly are reduced; the eccentric radius is fixed and unchangeable. Thus, the convenience in assembly and the controllability and requirements of a user are reduced. The motors for the fascia guns in the prior art do not use eccentric assemblies and adjusting mechanisms to adjust the eccentric radii, so that the application range is limited. Motor housings are not integrally connected to rotating central shafts, so that it is difficult to ensure the concentricity and perpendicularity between the motor housings and the rotating central shafts, and the operation stability of the motors is poor. Therefore, in response to the current situation, there is an urgent need for development of a variable-eccentric-radius brushless motor and an eccentric distance adjusting method, so as to meet the actual use requirements.

SUMMARY

In view of this, for the defects in the prior art, the present disclosure mainly aims to provide a variable-eccentric-radius brushless motor and an eccentric distance adjusting method. An eccentric assembly and an adjusting mechanism are used to adjust an eccentric radius, providing wider applicability. A motor housing is provided with an integrally connected rotating central shaft, so that the secondary connection between an outer rotor housing and the rotating central shaft of the motor is canceled in terms of process, the concentricity and perpendicularity between the motor housing and the rotating central shaft are improved, the risk of secondary connection is reduced, and the operation stability of the motor is improved.

In order to achieve the above purposes, the present disclosure adopts the following technical solution:

a variable-eccentric-radius brushless motor, including a rotor set, a stator set, an eccentric assembly, and an adjusting mechanism, where the rotor set is rotationally matched with the stator set; the rotor set is provided with a motor housing, and the motor housing is provided with an integrally connected rotating central shaft; the adjusting mechanism is provided with an adjusting shaft, and the adjusting shaft is in clearance fit inside the rotating central shaft in a manner of being movable along an axial direction of the rotating central shaft; the eccentric assembly is mounted on the motor housing in a manner of being rotatable with the motor housing; and the adjusting shaft moves along the axial direction of the rotating central shaft to drive an eccentric end of the eccentric assembly to get close to or away from the rotating central shaft.

As a preferred solution, the eccentric assembly includes an eccentric movable block and an eccentric support, the eccentric support is rotationally sleeved at an upper end of the adjusting shaft, the eccentric movable block is in wedge fit with the eccentric support, and the eccentric movable block movably gets close to or away from the rotating central shaft; the eccentric end of the eccentric assembly is the eccentric movable block; and the rotating central shaft is of a hollow structure, and the adjusting shaft is in clearance fit inside the hollow structure of the rotating central shaft.

As a preferred solution, the eccentric assembly further includes a sliding rail for guiding the eccentric movable block, the sliding rail is arranged on an upper side of the motor housing, the eccentric movable block is in sliding fit with the sliding rail, a first open slot penetrates through the eccentric movable block, a second open slot penetrates through the upper side of the motor housing, and the sliding rail penetrates through the first open slot and the second open slot; a positioning hole for positioning the sliding rail is formed in the upper side of the motor housing; and the eccentric movable block is provided with an inclined rod, and an inclined slot matched with the inclined rod is formed in the eccentric support.

As a preferred solution, the adjusting mechanism further includes an adjusting block capable of rotating forwards or backwards, the adjusting block is in running fit with a lower end of the adjusting shaft, and the adjusting block rotationally drives the adjusting shaft to move along the axial direction of the rotating central shaft.

As a preferred solution, the adjusting block is in running fit with the lower end of the adjusting shaft through a thread or a rotating sliding groove.

As a preferred solution, a limiting block for preventing the adjusting shaft from rotating is arranged above the adjusting block, the limiting block is sleeved on an outer side of the adjusting shaft, and the limiting block abuts against a lower end of the rotating central shaft.

As a preferred solution, a side wall of the adjusting shaft is configured to be in a flat shape, a D shape or a groove shape, and a specially-shaped hole matched with the flat shape, the D shape or the groove shape is formed in the limiting block.

As a preferred solution, a limiting plate for ensuring that the adjusting block is incapable of performing axial movement along the rotating central shaft and the adjusting block is only capable of performing radial rotational movement along the rotating central shaft is arranged on a lower side of the adjusting block, and the limiting plate is sleeved on the lower side of the adjusting block; and a limiting step for abutting against the limiting plate is arranged on the adjusting block, and an upper surface of the limiting plate abuts against the limiting step.

As a preferred solution, the stator set includes a wound stator, a first bearing, a driving PCB, a stator fixing frame, and a second bearing; the wound stator and the driving PCB are arranged on the stator fixing frame, an outer ring of the first bearing and an outer ring of the second bearing are fixed to the stator fixing frame, and an inner ring of the first bearing and an inner ring of the second bearing are fixed to the rotating central shaft of the motor housing; and indication lamps for displaying GND, NTC, PWM and FG are arranged on the driving PCB.

An eccentric distance adjusting method for the variable-eccentric-radius brushless motor includes the following steps:
firstly, enabling the adjusting block to rotate forwards or backwards, and enabling the adjusting shaft to move (rise/fall) along the axial direction of the rotating central shaft by enabling the adjusting block to rotate;
secondly, enabling the adjusting shaft to move along the axial direction of the rotating central shaft to drive the eccentric support to move together along the axial direction of the rotating central shaft; and
thirdly, enabling the eccentric support to move to push the eccentric movable block to slide on the sliding rail, and enabling the eccentric movable block to get close to or away from the rotating central shaft, thereby changing an eccentric radius or an eccentric distance.

Compared with the prior art, the present disclosure has the obvious advantages and beneficial effects. Specifically, it can be seen from the above technical solutions that
firstly, the eccentric assembly and the adjusting mechanism are used to adjust the eccentric radius, providing wider applicability;
secondly, the motor housing is provided with the integrally connected rotating central shaft, so that the secondary connection, such as welding and riveting, between the outer rotor housing and the rotating central shaft of the motor is canceled in terms of process and is replaced with the integrated forming of the motor housing and the rotating central shaft, the concentricity and perpendicularity between the motor housing and the rotating central shaft are improved, the vibration and wear of the motor are reduced, the risk of secondary connection is reduced, and the operation stability of the motor is improved;
thirdly, the eccentric assembly is used so that the motor has the eccentric force and eccentric torque; and the eccentric assembly is arranged in the same direction as the motor housing, so that it is ensured that the eccentric assembly and the motor housing are started synchronously during rotation of the motor, and the torque loss caused by the asynchronous movement of the post-assembled eccentric wheel during starting of the motor; and
fourthly, the limiting block is used to ensure that the adjusting shaft cannot rotate synchronously or rotate along the rotating central shaft; and the limiting plate is used to ensure that the adjusting block cannot perform the axial movement along the rotating central shaft and the adjusting block can only perform the radial rotational movement along the rotating central shaft, thereby ensuring the accuracy.

In order to illustrate the structural features and functions of the present disclosure more clearly, the present disclosure is described in detail below in conjunction with the accompanying drawings and specific embodiments.

DESCRIPTION OF REFERENCE NUMERALS

Figure 1:
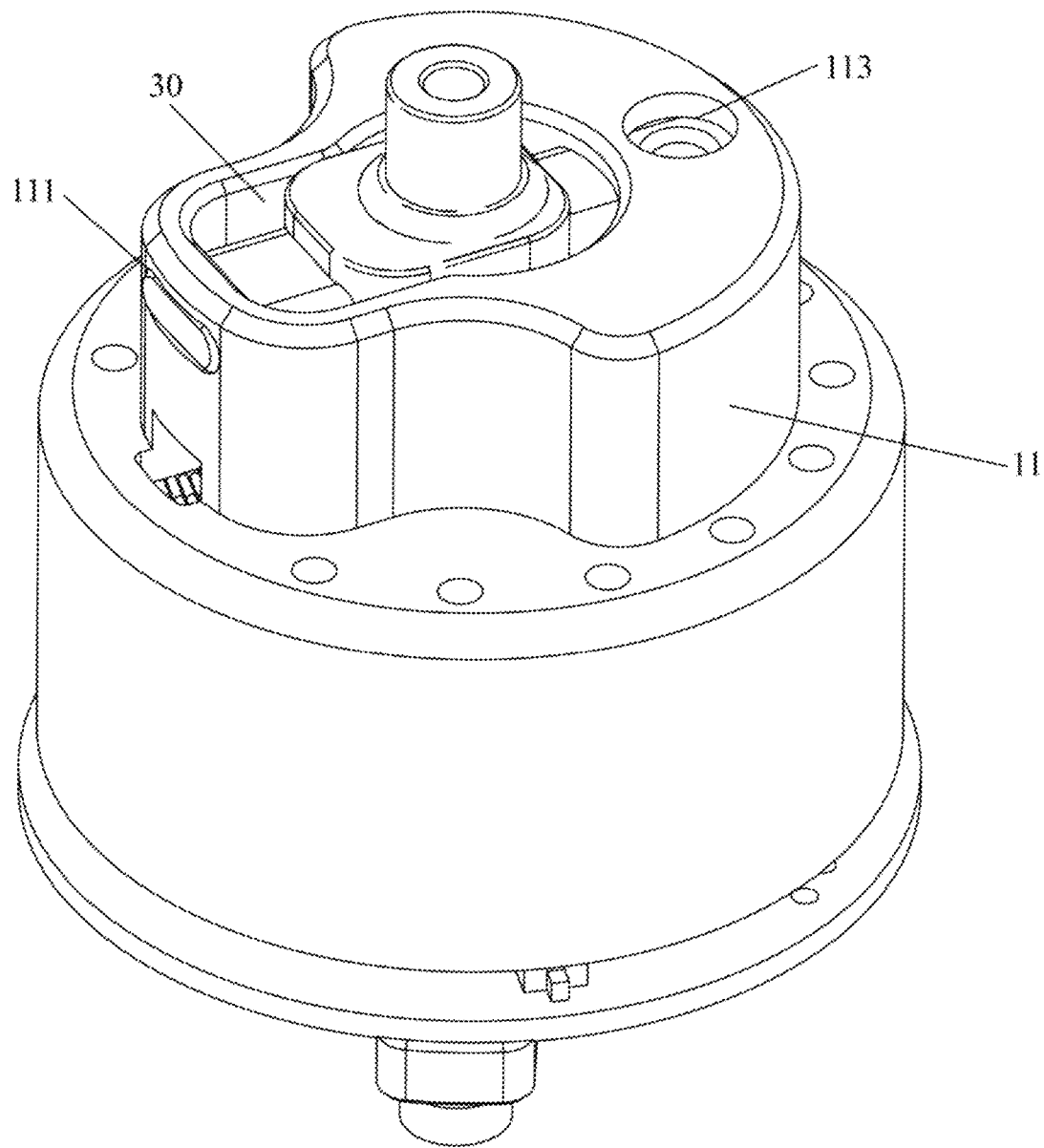
FIG. 1 is a three-dimensional structural schematic diagram of a variable-eccentric-radius brushless motor in the present disclosure at a first viewing angle.

In the drawings: 10. rotor set; 11. motor housing; 111. second open slot; 112. hollow structure; 113. positioning hole; 12. rotating central shaft; 20. stator set; 21. wound stator; 22. first bearing; 23. driving PCB; 231. indication lamp; 24. stator fixing frame; 25. second bearing; 30. eccentric assembly; 31. eccentric movable block; 311. inclined rod; 312. first open slot; 32. eccentric support; 321. inclined slot; 33. sliding rail; 40. adjusting mechanism; 41. adjusting shaft; 411. bearing; 42. adjusting block; 421. limiting step; 43. limiting block; 431. specially-shaped hole; and 44. limiting plate.

DETAILED DESCRIPTION OF THE EMBODIMENTS

Figure 2:
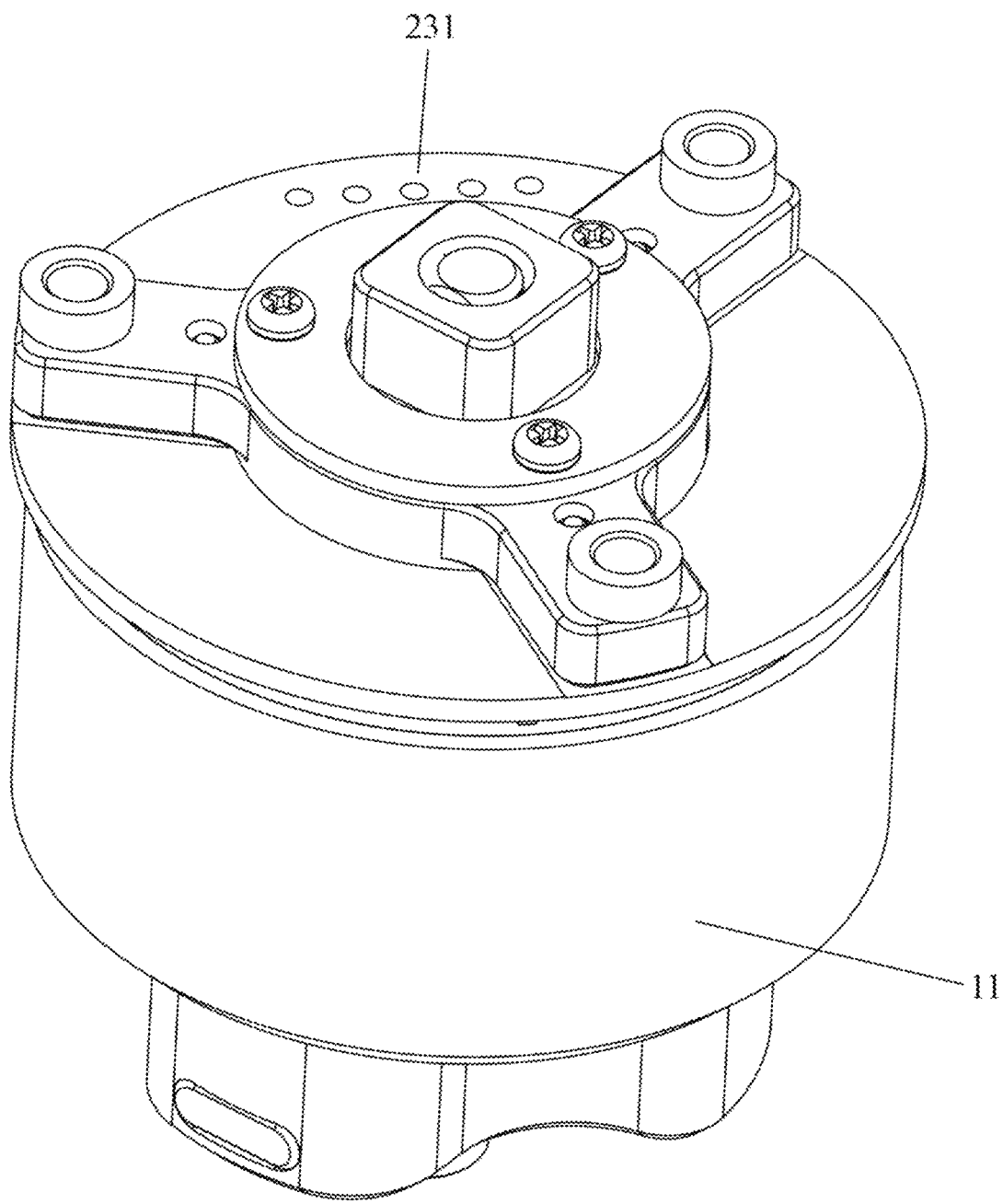
FIG. 2 is a three-dimensional structural schematic diagram of the variable-eccentric-radius brushless motor in the present disclosure at a second viewing angle.
Figure 3:
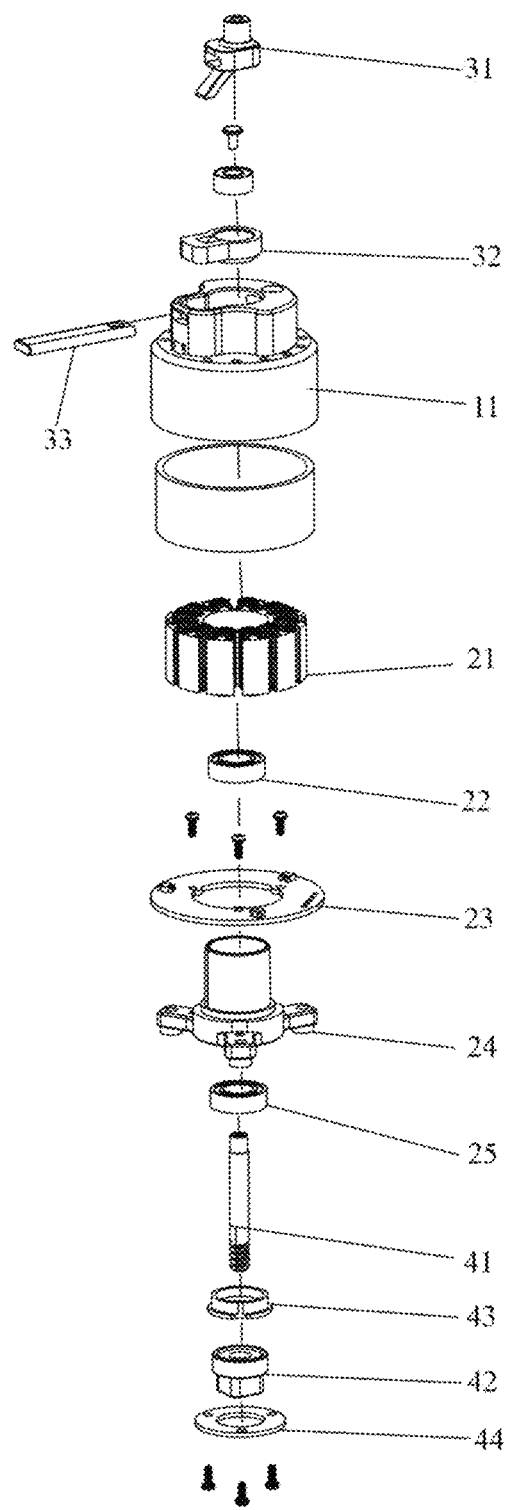
FIG. 3 is an exploded view of the variable-eccentric-radius brushless motor in the present disclosure.
Figure 4:
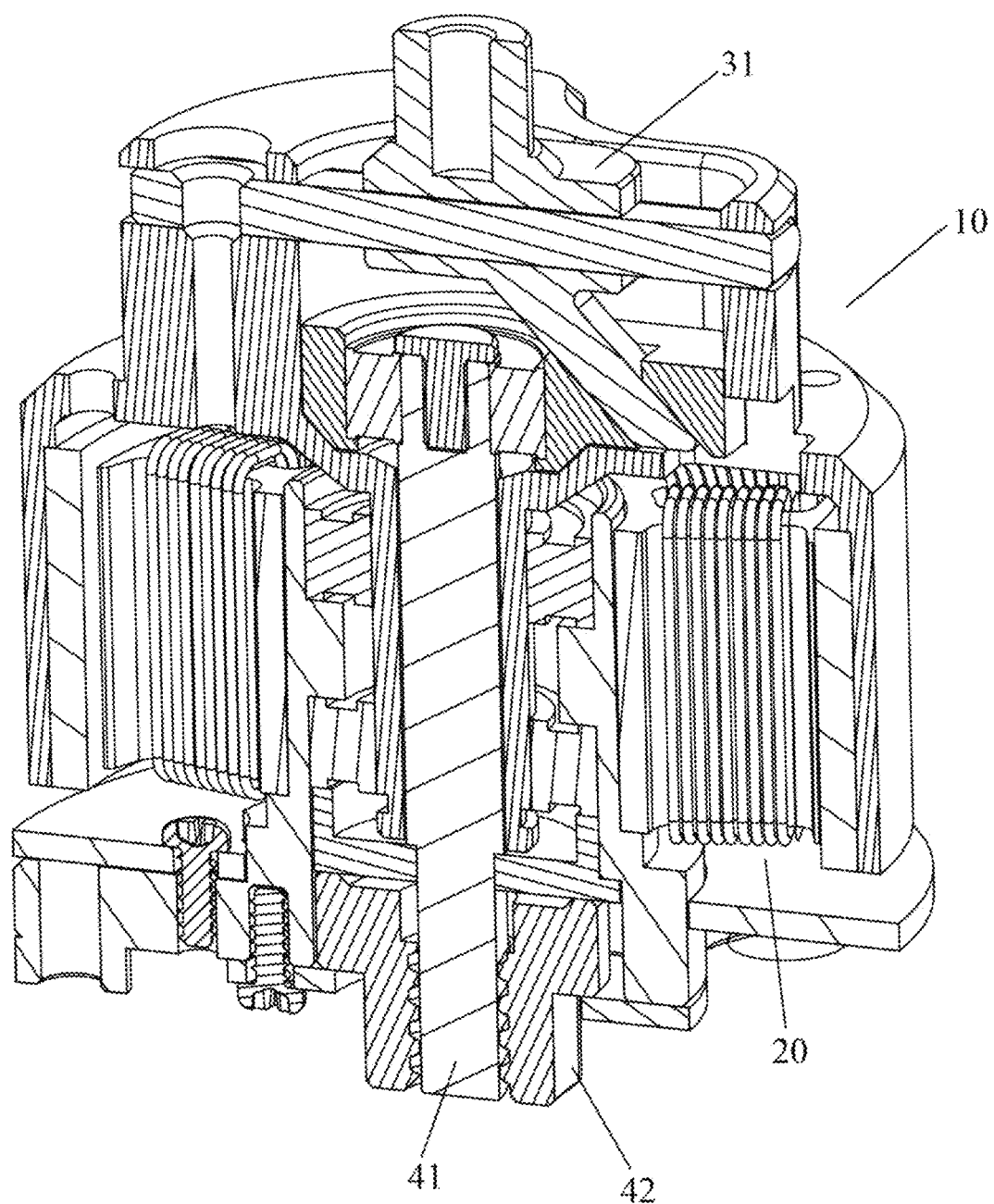
FIG. 4 is a sectional view of the variable-eccentric-radius brushless motor in the present disclosure.
Figure 5:
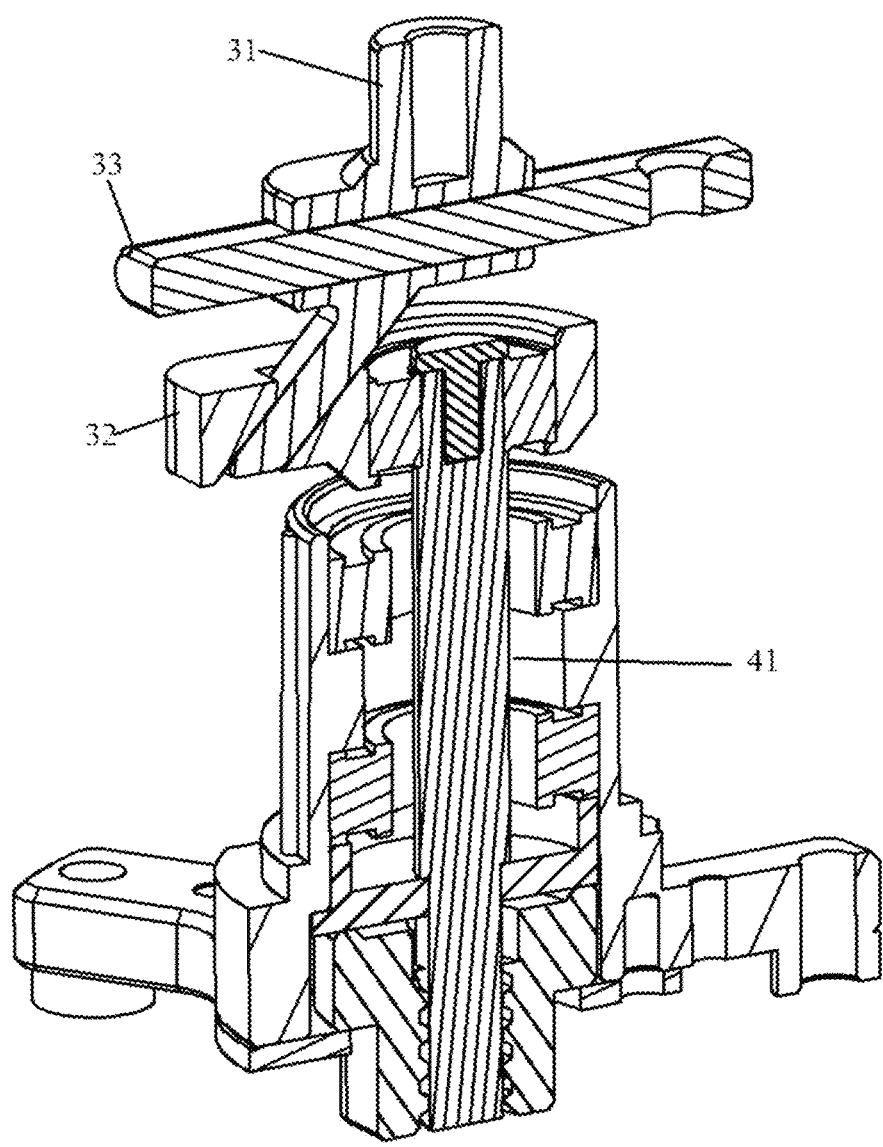
FIG. 5 is a three-dimensional structural schematic diagram of an eccentric assembly in the present disclosure.
Figure 6:
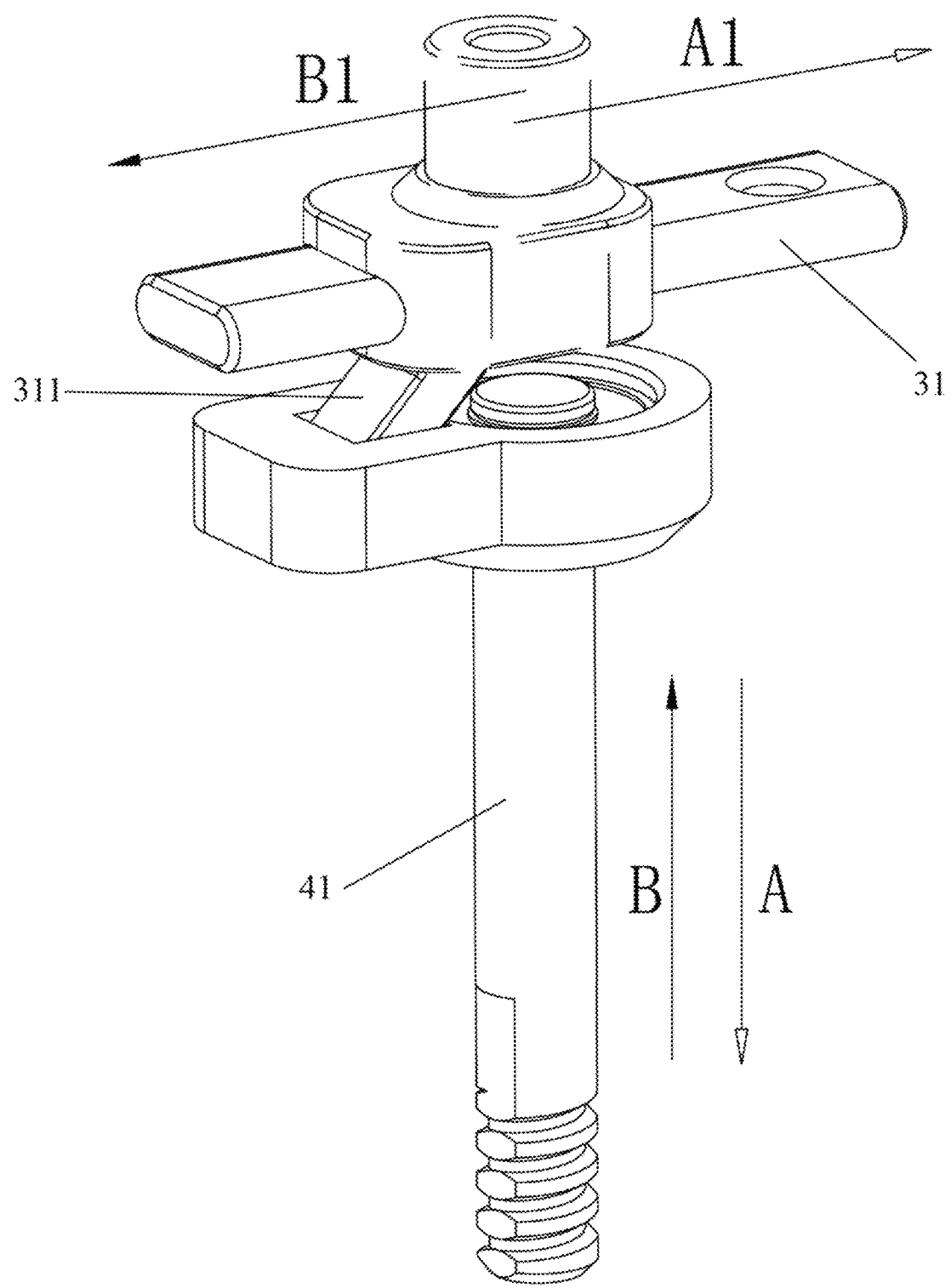
FIG. 6 is a three-dimensional structural schematic diagram of the eccentric assembly and an adjusting shaft in the present disclosure.
Figure 7:
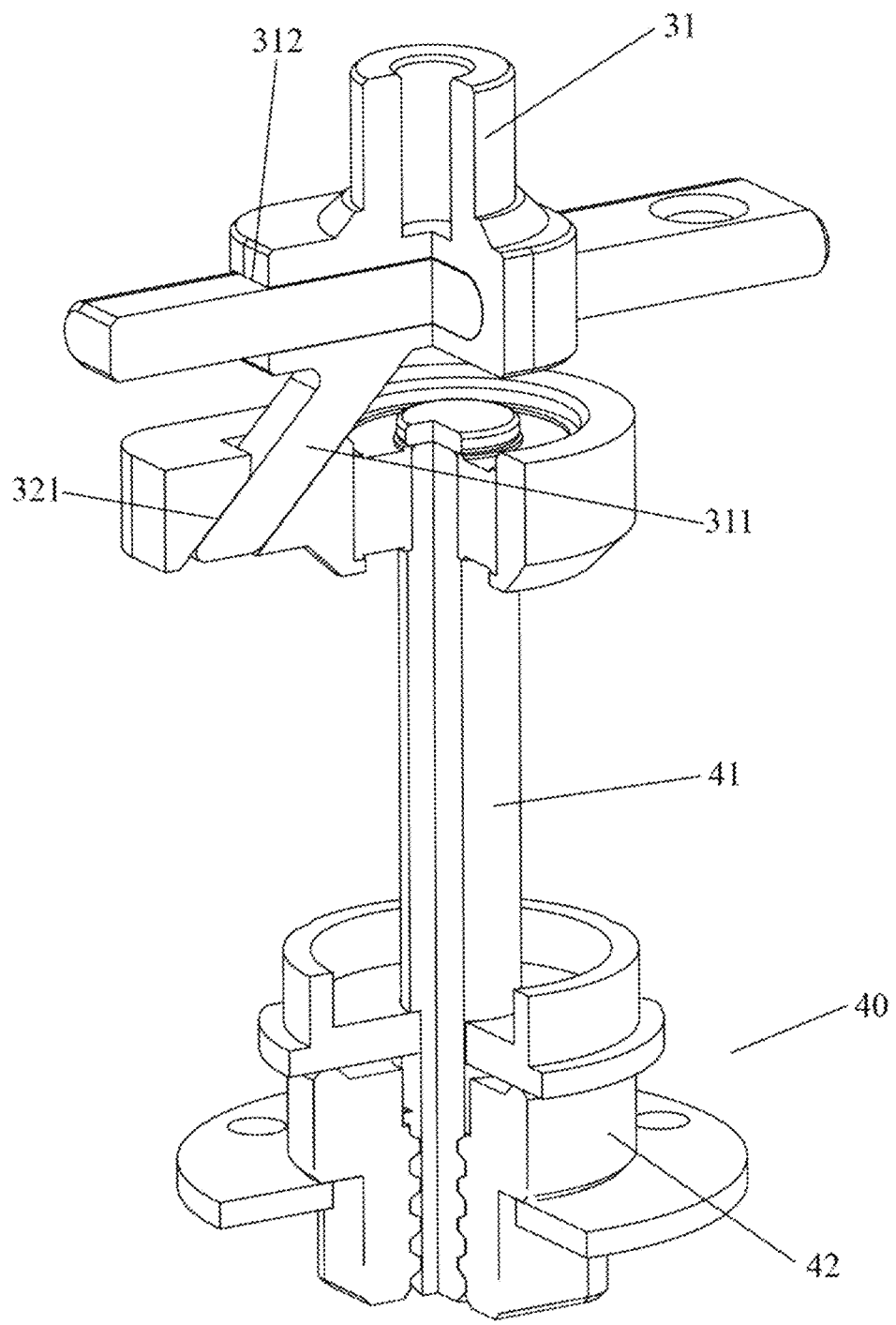
FIG. 7 is a three-dimensional structural schematic diagram of the eccentric assembly and an adjusting mechanism in the present disclosure.
Figure 8:
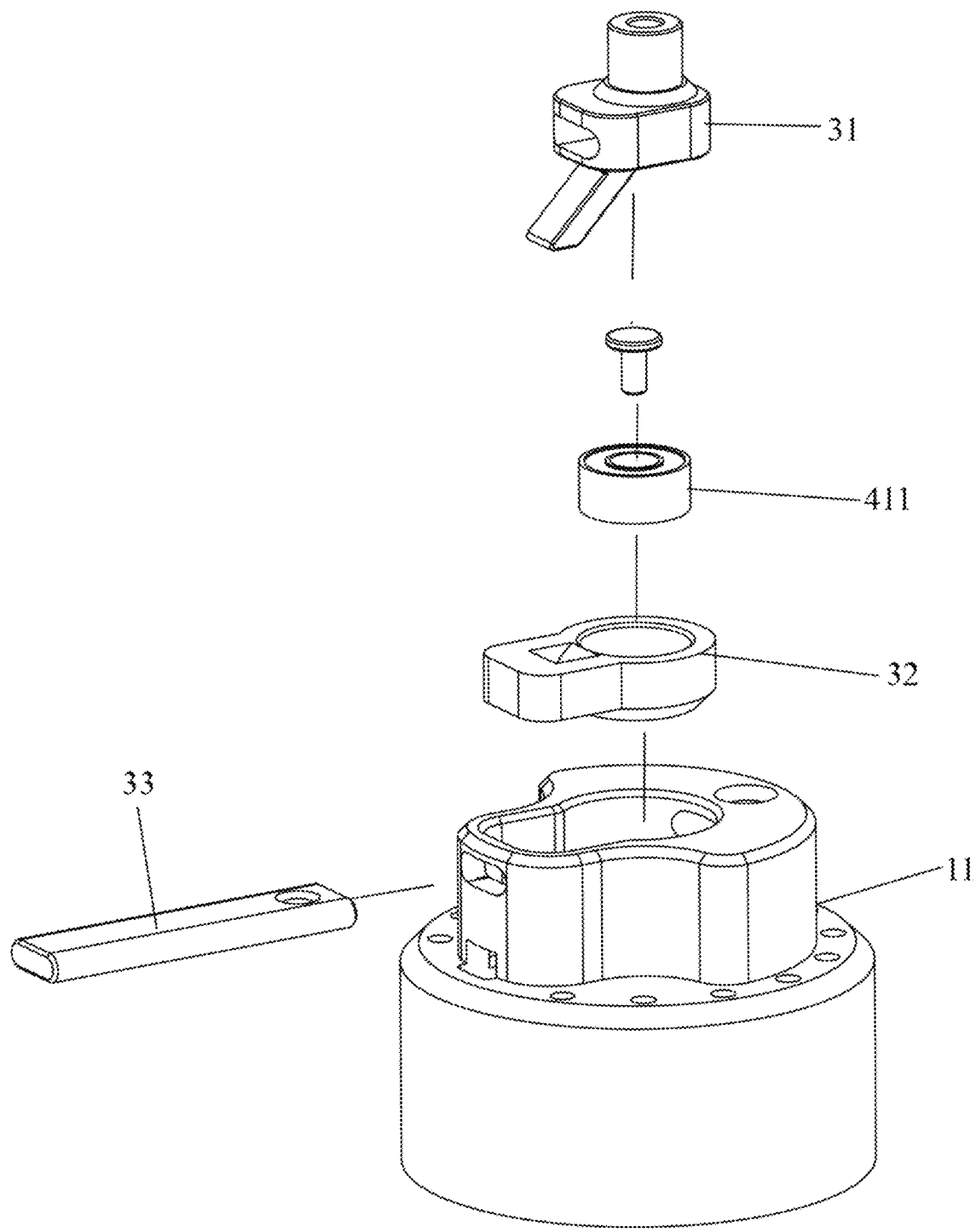
FIG. 8 is an exploded view of the eccentric assembly and a motor housing in the present disclosure.
Figure 9:
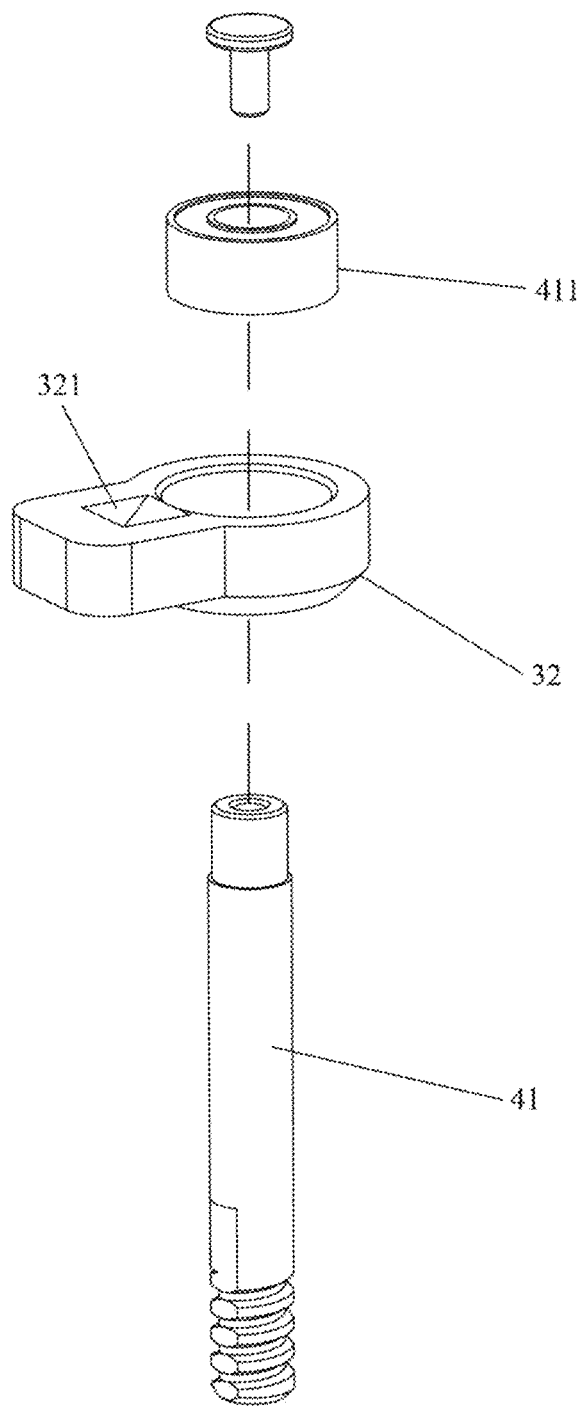
FIG. 9 is an exploded view of an eccentric support and the adjusting shaft in the present disclosure.
Figure 10:
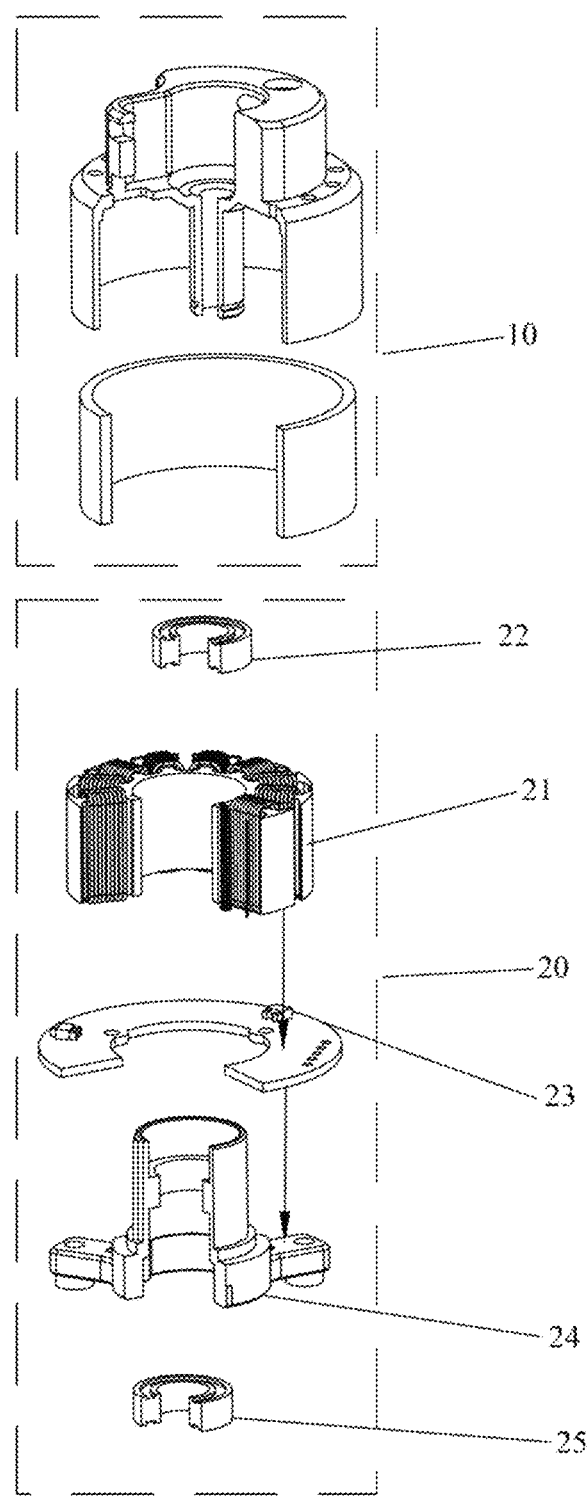
FIG. 10 is an exploded view of a rotor set and a stator set in the present disclosure.
Figure 11:
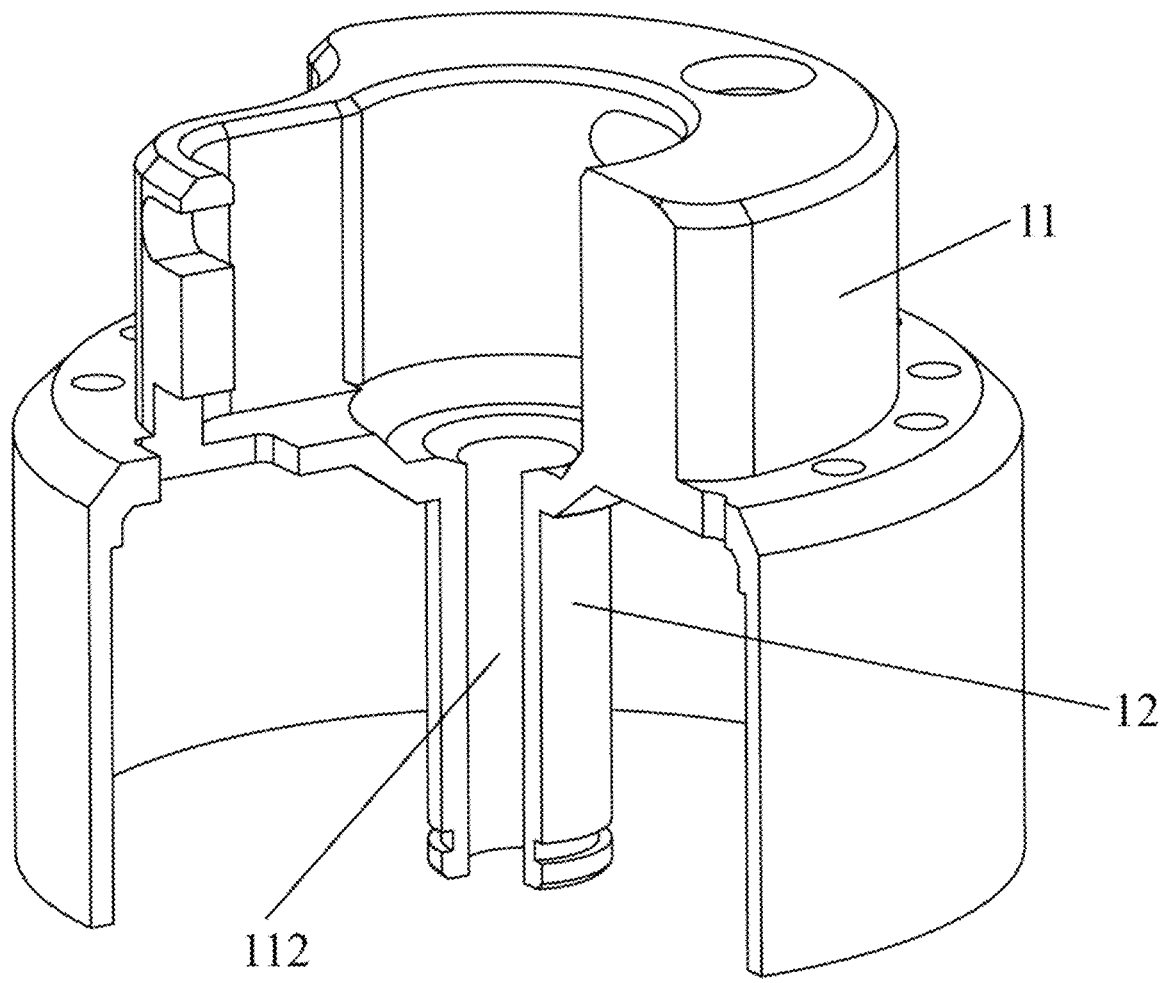
FIG. 11 is a three-dimensional structural schematic diagram of the motor housing in the present disclosure.
Figure 12:
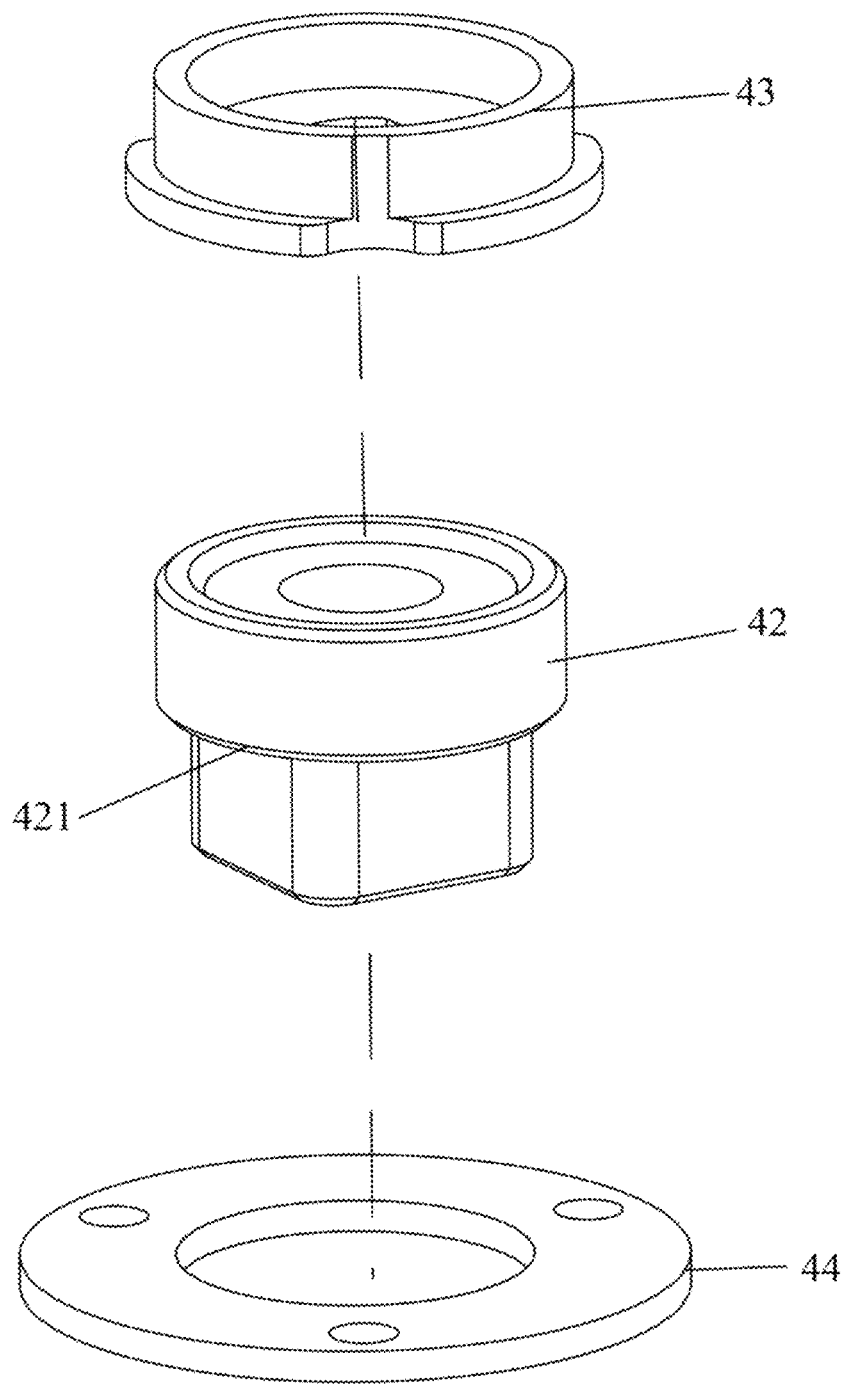
FIG. 12 is a three-dimensional structural schematic diagram of an adjusting block, a limiting block and a limiting plate in the present disclosure.
Figure 13:
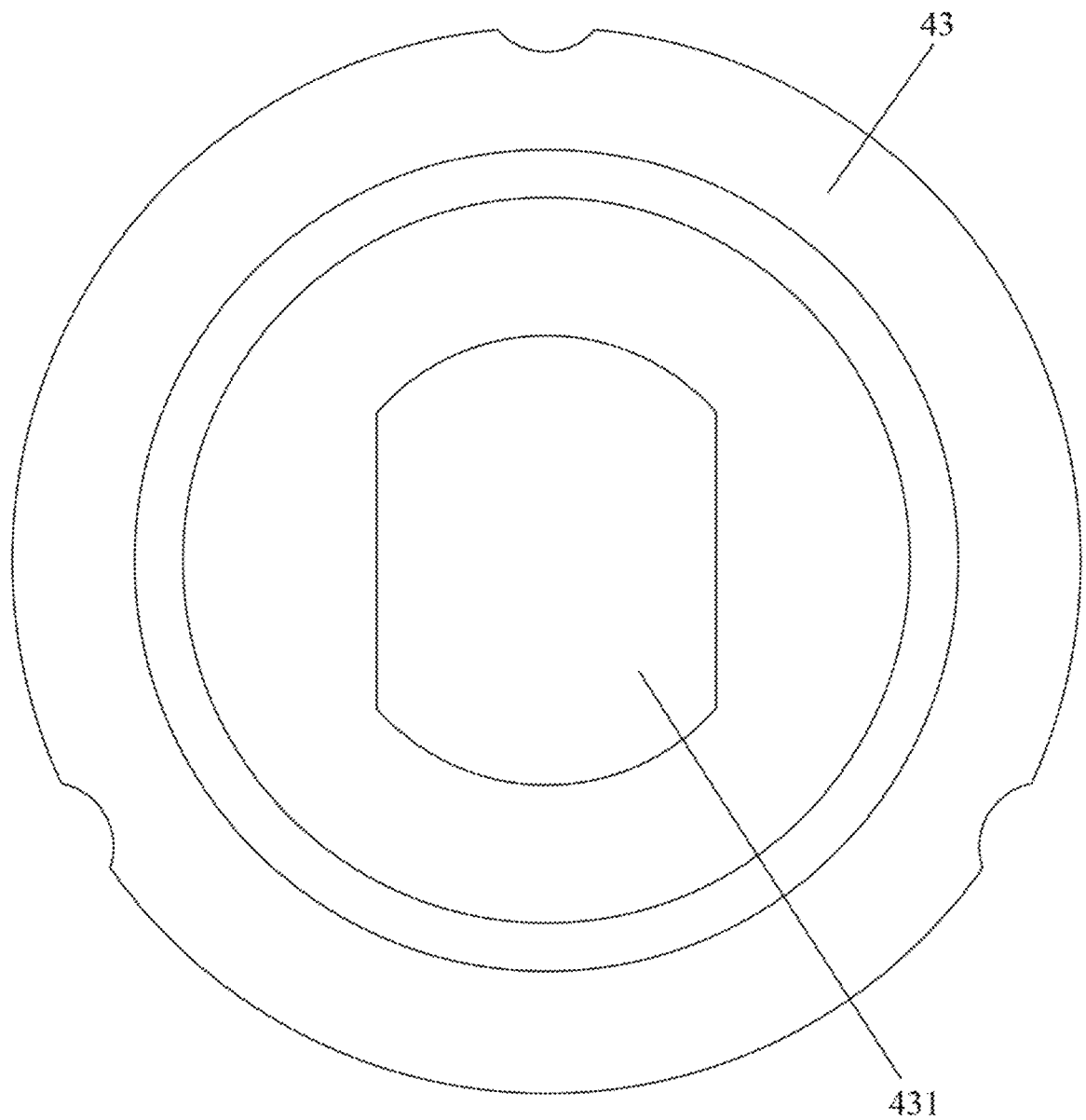
FIG. 13 is a three-dimensional structural schematic diagram of the limiting block in the present disclosure.

As shown in FIG. 1 to FIG. 13, the present disclosure provides a variable-eccentric-radius brushless motor and an eccentric distance adjusting method. The variable-eccentric-radius brushless motor includes a rotor set 10, a stator set 20, an eccentric assembly 30, and an adjusting mechanism 40.

The rotor set 10 is rotationally matched with the stator set 20; the rotor set 10 is provided with a motor housing 11, and the motor housing 11 is provided with an integrally connected rotating central shaft 12; the adjusting mechanism 40 is provided with an adjusting shaft 41, and the adjusting shaft 41 is in clearance fit inside the rotating central shaft 12 in a manner of being movable along an axial direction of the rotating central shaft; the eccentric assembly 30 is mounted on the motor housing 11 in a manner of being rotatable with the motor housing 11; and the adjusting shaft 41 moves along the axial direction of the rotating central shaft to drive an eccentric end of the eccentric assembly 30 to get close to or away from the rotating central shaft 12.

The eccentric assembly 30 includes an eccentric movable block 31 and an eccentric support 32, the eccentric support 32 is rotationally sleeved at an upper end of the adjusting shaft 41, the eccentric movable block 31 is in wedge fit with the eccentric support 32, and the eccentric movable block 31 movably gets close to or away from the rotating central shaft 12; the eccentric end of the eccentric assembly 30 is the eccentric movable block 31; and the rotating central shaft 12 is of a hollow structure 112, and the adjusting shaft 41 is in clearance fit inside the hollow structure 112 of the rotating central shaft 12.

A bearing 411 is arranged between the eccentric support 32 and the adjusting shaft 41, and the eccentric support 32 is rotationally sleeved at the upper end of the adjusting shaft 41 through the bearing 411; and the bearing 411 is pressed into the eccentric support 32 and then is mounted at a step position at a front end of adjusting shaft 41, and a screw is locked in a hole in the front end of adjusting shaft 41 for fixing.

The eccentric movable block 31 can rotate with the motor housing 11, and when the center of the eccentric movable block 31 gets away from the rotating central shaft 12, an eccentric rotating radius increases; and the eccentric movable block 31 can rotate with the motor housing 11, and when the center of the eccentric movable block 31 gets close to the rotating central shaft 12, the eccentric rotating radius decreases.

The eccentric assembly 30 further includes a sliding rail 33 for guiding the eccentric movable block 31, the sliding rail 33 is arranged on an upper side of the motor housing 11, the eccentric movable block 31 is in sliding fit with the sliding rail 33, a first open slot 312 penetrates through the eccentric movable block 31, a second open slot 111 penetrates through the upper side of the motor housing 11, and the sliding rail 33 penetrates through the first open slot 312 and the second open slot 111; a positioning hole 113 for positioning the sliding rail 33 is formed in the upper side of the motor housing 11; and the eccentric movable block 31 is provided with an inclined rod 311, and an inclined slot 321 matched with the inclined rod 311 is formed in the eccentric support 32.

The movement relationship between the adjusting shaft 41 and the eccentric movable block 31 is as follows: the movement directions of the adjusting shaft 41 are A and B; the movement directions of the eccentric movable block 31 are A1 and B1; when the adjusting shaft 41 moves in the direction A, the eccentric movable block 31 moves along the sliding rail 33 to get close to the rotating central shaft 12, that is, the eccentric movable block 31 moves in the direction A1; and when adjusting shaft 41 moves in the direction B, the eccentric movable block 31 moves along the sliding rail 33 to get away from the rotating central shaft 12, that is, the eccentric movable block 31 moves in the direction B1.

The adjusting mechanism 40 further includes an adjusting block 42 capable of rotating forwards or backwards, the adjusting block 42 is in running fit with a lower end of the adjusting shaft 41, and the adjusting block 42 rotationally drives the adjusting shaft 41 to move along the axial direction of the rotating central shaft; the adjusting block 42 is in running fit with the lower end of the adjusting shaft 41 through a thread or a rotating sliding groove; and the rotating sliding groove may be a threaded rotating sliding groove capable of ensuring the rotation of the adjusting block.

A limiting block 43 for preventing the adjusting shaft 41 from rotating is arranged above the adjusting block 42, the limiting block 43 is sleeved on an outer side of the adjusting shaft 41, and the limiting block 43 abuts against a lower end of the rotating central shaft 12; through the limiting block 43, the adjusting shaft 41 is prevented from rotating synchronously or along the rotating central shaft 12; a side wall of the adjusting shaft 41 is configured to be in a flat shape, a D shape or a groove shape, and a specially-shaped hole 431 matched with the flat shape, the D shape or the groove shape is formed in the limiting block 43; a limiting plate 44 for ensuring that the adjusting block 42 is incapable of performing axial movement along the rotating central shaft 12 and the adjusting block 42 is only capable of performing radial rotational movement along the rotating central shaft 12 is arranged on a lower side of the adjusting block 42, and the limiting plate 44 is sleeved on the lower side of the adjusting block 42; a limiting step 421 for abutting against the limiting plate 44 is arranged on the adjusting block 42, and an upper surface of the limiting plate 44 abuts against the limiting step 421; and through the forward/backward rotation of the adjusting block 42, under the action of the thread (or the rotating sliding groove), the adjusting shaft 41 moves in the direction A or B along the axial direction of the rotating central shaft.

The stator set 20 includes a wound stator 21, a first bearing 22, a driving PCB 23, a stator fixing frame 24, and a second bearing 25; the wound stator 21 and the driving PCB 23 are arranged on the stator fixing frame 24, an outer ring of the first bearing 22 and an outer ring of the second bearing 25 are fixed to the stator fixing frame 24, and an inner ring of the first bearing 22 and an inner ring of the second bearing 25 are fixed to the rotating central shaft 12 of the motor housing 11; indication lamps 231 for displaying GND, NTC, PWM and FG are arranged on the driving PCB 23; and when the motor housing 11 rotates, the inner ring of the first bearing 22 and the inner ring of the second bearing 25 rotate together with same.

This patent integrates the motor, an eccentric wheel and an adjustable-eccentric-radius movement and transmission component, so that the internal space size of a fascia gun is effectively reduced, and the assembly accuracy and movement stability of the fascia gun during assembly arc improved. The motor of this patent used on the fascia gun can be regarded as a motor module, which is directly assembled on a housing of the fascia gun, and compared with the post-assembled eccentric wheel and eccentric radius adjusting structure, the assembly and maintenance costs of the fascia gun are reduced. For a large number of fascia gun producers, the solutions of this patent can provide a motor capable of adjusting the beating stroke (the piston movement stroke) of the fascia gun, an adjustable transmission component does not need to be designed and assembled additionally, and a series of problems about the space size of the post-assembly design, the assembly and maintenance and the increase in cost are solved.

Compared with a traditional motor, a rotating shaft of the motor is canceled, (the rotating central shaft 12 and the motor housing 11 are an integral body), so that the space in the center of the motor is effectively used to adjust the eccentric assembly 30, and the adjusting shaft 41 cannot rotate on its axis (perform radial and circumferential movement) and can only move along the axial direction of the rotating central shaft; the adjusting shaft and the rotor set 10 of the motor form a movable structure and a stationary structure, do not affect each other, and do not interfere with each other; (and the adjusting shaft 41 in the center of the motor can be adjusted manually or electrically).

The present applicable has the advantages as follows: the motor housing 11 is equipped with an eccentric counterweight; no eccentric wheel needs to be assembled later; the eccentric radius is adjustable, the applicability is wider, and the user can adjust the movement length of a piston according to different massage requirements during operation, that is, changing the massage beating depth; alternatively, the user can adjust the eccentric radius according to different thickness and depth requirements during drilling, thereby improving the beating efficiency; the motor is suitable for the fascia gun or an electric hammer.

An eccentric distance adjusting method for the variable-eccentric-radius brushless motor includes the following steps:

firstly, enabling the adjusting block to rotate forwards or backwards, and enabling the adjusting shaft to move (rise/fall) along the axial direction of the rotating central shaft by enabling the adjusting block to rotate;

secondly, enabling the adjusting shaft to move along the axial direction of the rotating central shaft to drive the eccentric support to move together along the axial direction of the rotating central shaft; and thirdly, enabling the eccentric support to move to push the eccentric movable block to slide on the sliding rail, and enabling the eccentric movable block to get close to or away from the rotating central shaft, thereby changing an eccentric radius or an eccentric distance.

A use method and principle of the variable-eccentric-radius brushless motor are as follows:

the driving PCB 23 is connected to an external power source (VCC and GND) to be powered on; the wound stator 21 (formed by winding an enameled wire or an insulated copper wire on a silicon steel sheet set) forms multiple pairs of electrode windings; an annular permanent magnet or magnet set is fixed in the motor housing 11; the motor housing 11 and the stator fixing frame 24 are connected and assembled through the first bearing 22 and the second bearing 25; when the external power source is connected, the electrode windings in the wound stator 21 are alternately powered on through the driving PCB 23, so that the electrode windings undergo opposite magnetic attraction with a magnet or magnetic ring on the rotor set 10, and pull and drive the rotor set 10 to rotate during the alternate powered-on attraction process; the rotor set 10 rotates relative to the stator set 20, and the motor housing 11 and the rotating central shaft 12 rotate; the first bearing 22 and the second bearing 25 each have the movement characteristic that the inner ring and the outer ring can rotate freely, so that when the eccentric support 32, the eccentric movable block 31 and the sliding rail 33 rotate with the motor housing 11, under the limiting action of the limiting block 43, the adjusting shaft 41 does not rotate synchronously; and the rotor set 10 rotates along the rotating central shaft 12, and the adjusting shaft 41 cannot rotate.

The design points of the present disclosure lie in:

firstly, the eccentric assembly and the adjusting mechanism are used to adjust the eccentric radius, providing wider applicability;

secondly, the motor housing is provided with the integrally connected rotating central shaft, so that the secondary connection, such as welding and riveting, between the outer rotor housing and the rotating central shaft of the motor is canceled in terms of process and is replaced with the integrated forming of the motor housing and the rotating central shaft, the concentricity and perpendicularity between the motor housing and the rotating central shaft are improved, the vibration and wear of the motor are reduced, the risk of secondary connection is reduced, and the operation stability of the motor is improved;

thirdly, the eccentric assembly is used so that the motor has the eccentric force and eccentric torque; and the eccentric assembly is arranged in the same direction as the motor housing, so that it is ensured that the eccentric assembly and the motor housing are started synchronously during rotation of the motor, and the torque loss caused by the asynchronous movement of the post-assembled eccentric wheel during starting of the motor; and fourthly, the limiting block is used to ensure that the adjusting shaft cannot rotate synchronously or rotate along the rotating central shaft; and the limiting plate is used to ensure that the adjusting block cannot perform the axial movement along the rotating central shaft and the adjusting block can only perform the radial rotational movement along the rotating central shaft, thereby ensuring the accuracy.

The above are only the preferred embodiments of the present disclosure, and are not intended to limit the technical scope the present disclosure in any way. Therefore, any fine amendment, equivalent change, or modification made to the above embodiments in accordance with the technical essence of the present disclosure still falls within the scope of the technical solutions of the present disclosure.

What is claimed is:

1. A variable-eccentric-radius brushless motor, comprising a rotor set, a stator set, an eccentric assembly, and an adjusting mechanism, wherein the rotor set is rotationally matched with the stator set; the rotor set is provided with a motor housing, and the motor housing is provided with an integrally connected rotating central shaft; the adjusting mechanism is provided with an adjusting shaft, and the adjusting shaft is in clearance fit inside the rotating central shaft in a manner of being movable along an axial direction of the rotating central shaft; the eccentric assembly is mounted on the motor housing in a manner of being rotatable with the motor housing; and the adjusting shaft moves along the axial direction of the rotating central shaft to drive an eccentric end of the eccentric assembly to get close to or away from the rotating central shaft.

2. The variable-eccentric-radius brushless motor according to claim 1, wherein the eccentric assembly comprises an eccentric movable block and an eccentric support, the eccentric support is rotationally sleeved at an upper end of the adjusting shaft, the eccentric movable block is in wedge fit with the eccentric support, and the eccentric movable block movably gets close to or away from the rotating central shaft; the eccentric end of the eccentric assembly is the eccentric movable block; and the rotating central shaft is of a hollow structure, and the adjusting shaft is in clearance fit inside the hollow structure of the rotating central shaft.

3. The variable-eccentric-radius brushless motor according to claim 2, wherein the eccentric assembly further comprises a sliding rail for guiding the eccentric movable block, the sliding rail is arranged on an upper side of the motor housing, the eccentric movable block is in sliding fit with the sliding rail, a first open slot penetrates through the eccentric movable block, a second open slot penetrates through the upper side of the motor housing, and the sliding rail penetrates through the first open slot and the second open slot; a positioning hole for positioning the sliding rail is formed in the upper side of the motor housing; and the eccentric movable block is provided with an inclined rod, and an inclined slot matched with the inclined rod is formed in the eccentric support.

4. The variable-eccentric-radius brushless motor according to claim 1, wherein the adjusting mechanism further comprises an adjusting block capable of rotating forwards or backwards, the adjusting block is in running fit with a lower end of the adjusting shaft, and the adjusting block rotationally drives the adjusting shaft to move along the axial direction of the rotating central shaft.

5. The variable-eccentric-radius brushless motor according to claim 4, wherein the adjusting block is in running fit with the lower end of the adjusting shaft through a thread or a rotating sliding groove.

6. The variable-eccentric-radius brushless motor according to claim 4, wherein a limiting block for preventing the adjusting shaft from rotating is arranged above the adjusting block, the limiting block is sleeved on an outer side of the adjusting shaft, and the limiting block abuts against a lower end of the rotating central shaft.

7. The variable-eccentric-radius brushless motor according to claim 6, wherein a side wall of the adjusting shaft is configured to be in a flat shape, a D shape or a groove shape, and a specially-shaped hole matched with the flat shape, the D shape or the groove shape is formed in the limiting block.

8. The variable-eccentric-radius brushless motor according to claim 6, wherein a limiting plate for ensuring that the adjusting block is incapable of performing axial movement along the rotating central shaft and the adjusting block is only capable of performing radial rotational movement along the rotating central shaft is arranged on a lower side of the adjusting block, and the limiting plate is sleeved on the lower side of the adjusting block; and a limiting step for abutting against the limiting plate is arranged on the adjusting block, and an upper surface of the limiting plate abuts against the limiting step.

9. The variable-eccentric-radius brushless motor according to claim 1, wherein the stator set comprises a wound stator, a first bearing, a driving PCB, a stator fixing frame, and a second bearing; the wound stator and the driving PCB are arranged on the stator fixing frame, an outer ring of the first bearing and an outer ring of the second bearing are fixed to the stator fixing frame, and an inner ring of the first bearing and an inner ring of the second bearing are fixed to the rotating central shaft of the motor housing; and indication lamps for displaying GND, NTC, PWM and FG are arranged on the driving PCB.

10. An eccentric distance adjusting method for the variable-eccentric-radius brushless motor according to claim 2, comprising the following steps:
   firstly, enabling an adjusting block to rotate forwards or backwards, and enabling the adjusting shaft to move along the axial direction of the rotating central shaft by enabling the adjusting block to rotate;
   secondly, enabling the adjusting shaft to move along the axial direction of the rotating central shaft to drive the eccentric support to move together along the axial direction of the rotating central shaft; and
   thirdly, enabling the eccentric support to move to push the eccentric movable block to slide on a sliding rail, and enabling the eccentric movable block to get close to or away from the rotating central shaft, thereby changing an eccentric radius or an eccentric distance.

* * * * *